(No Model.)  2 Sheets—Sheet 1.

W. P. GAY.
MAKING TAPE FROM LEATHER BOARD OR OTHER MATERIAL.

No. 518,030. Patented Apr. 10, 1894.

WITNESSES
Frank G. Parker
Frank G. Hatter

INVENTOR
William P. Gay (No Model.) 2 Sheets—Sheet 2.

W. P. GAY.
MAKING TAPE FROM LEATHER BOARD OR OTHER MATERIAL.

No. 518,030. Patented Apr. 10, 1894.

WITNESSES
Frank G. Parker
Frank G. Hattie

INVENTOR
William P. Gay

UNITED STATES PATENT OFFICE.

WILLIAM P. GAY, OF LEOMINSTER, MASSACHUSETTS.

MAKING TAPE FROM LEATHER-BOARD OR OTHER MATERIAL.

SPECIFICATION forming part of Letters Patent No. 518,030, dated April 10, 1894.

Application filed September 15, 1893. Serial No. 485,624. (No model.)

*To all whom it may concern:*

Be it known that I, WILLIAM P. GAY, of Leominster, in the county of Worcester and State of Massachusetts, have invented a new and useful Improvement in Making Tape from Leather-Board or other Material, of which the following, taken in connection with the accompanying drawings, is a specification.

My invention relates to making leather-board tape direct from the "wet" roll, and consists of an automatically-moving circular cutter and shield piece, so arranged that as the cylindrical sheet of leather-board on the wet roll rotates a strip of tape will be cut from it and be directed away from the roll by the shield, ready to be dried previously to its being cut into strips and calendered; the object being to produce a leather-board tape of great length in a cheap and rapid manner. This object I attain by means of the mechanism shown in the accompanying drawings, in which—

Figure 1:
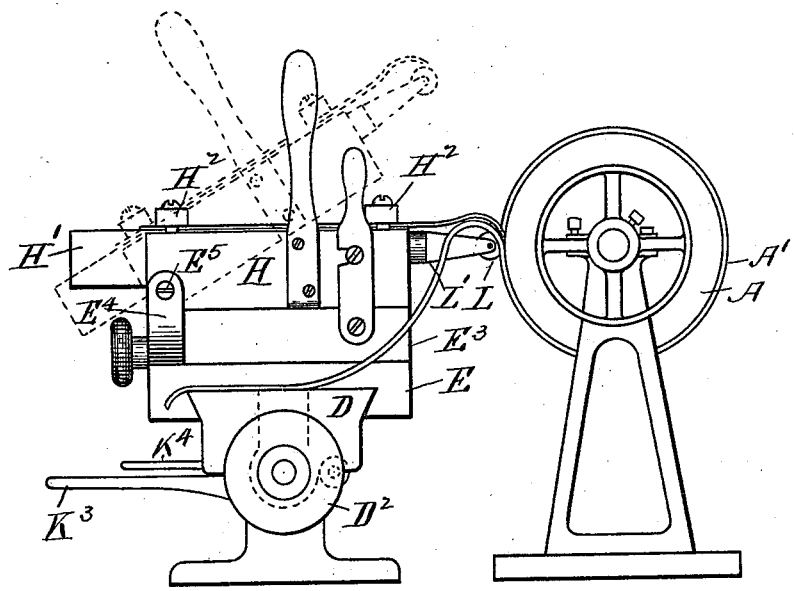
Figure 2:
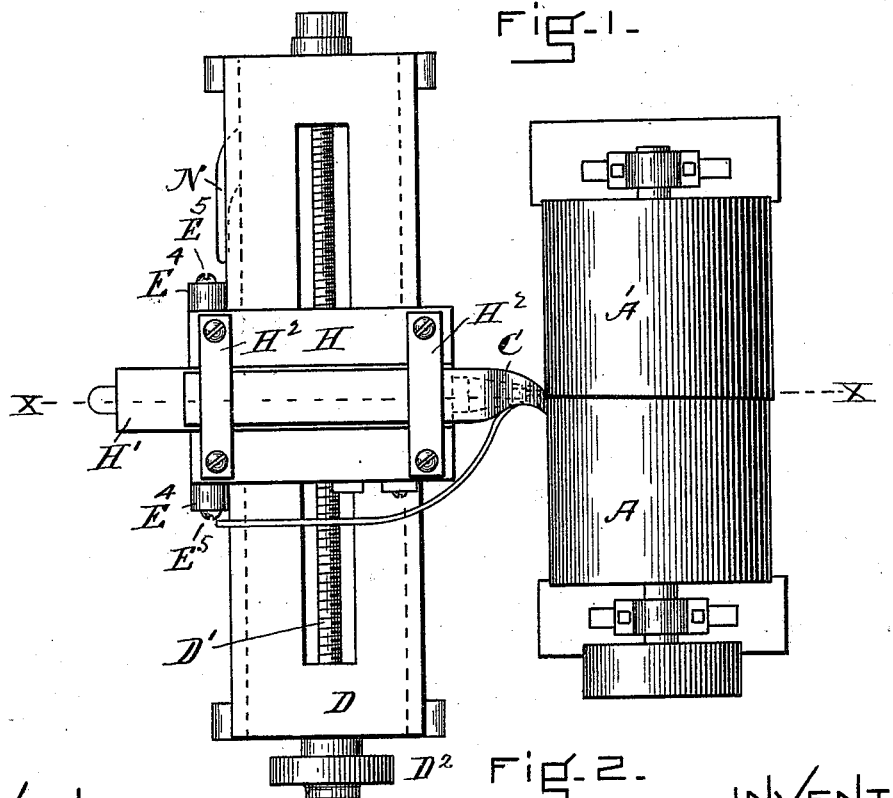
Figure 3:
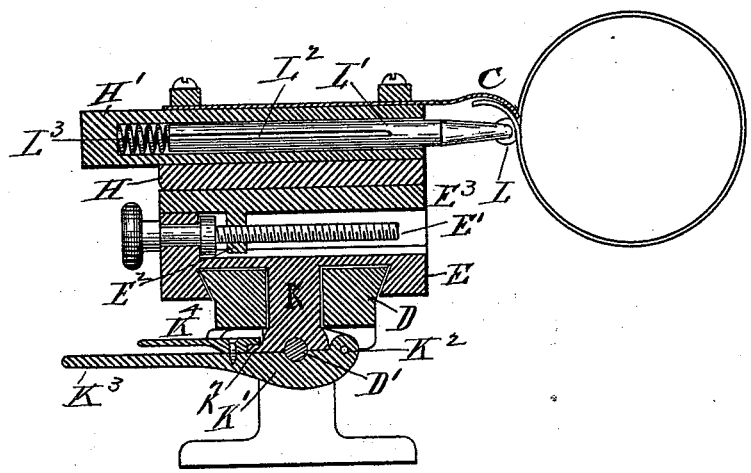
Figure 5:
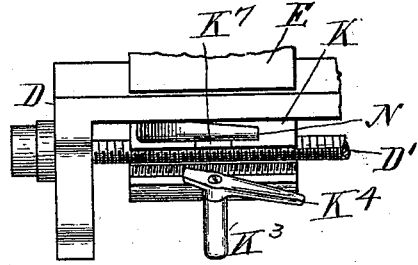
Figure 4:
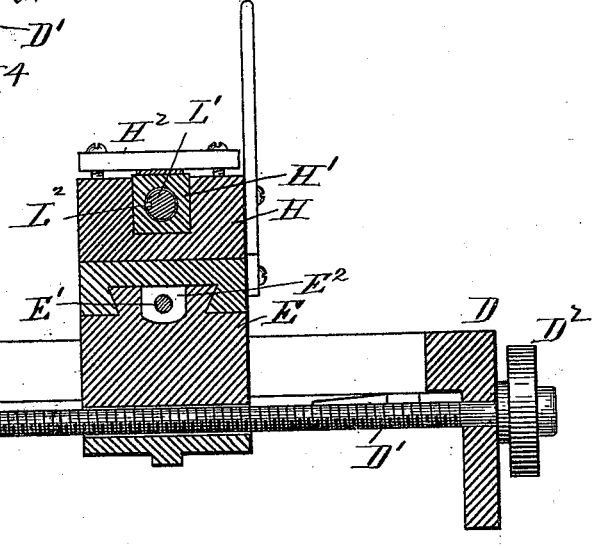

Figure 1 is an end elevation of one of my machines, showing also the wet roll of a leather-board machine. Fig. 2 is a plan of the same. Fig. 3 is a cross-vertical section taken on line $x$—$x$ of Fig. 2. Fig. 4 is a longitudinal vertical section of the machine. Fig. 5 is a view in side elevation of a part of my machine.

As leather-board is made in sheets of but a few feet in length, it is impossible to make a tape of it in long strips, the length being necessarily limited to the length of the sheet from which it is cut. My method is to cut from a hollow cylinder of leather-board, while still on the wet roll, a narrow strip by means of a cutter that moves longitudinally, in relation to the hollow cylinder, while said cylinder is rotating, the motion of the cutter during a single rotation being equal to the width of the strip to be cut off, so that the cut will be spiral and the strip cut off will be in length equal to the circumference of the cylinder multiplied by the number of turns that it makes while the cutter is traversing the length of the cylinder; thus, if the cylinder is six feet in circumference and fifty inches long and the tape cut off is one inch wide, then the total length of the tape cut off would be six feet multiplied by fifty,—that is three hundred feet. I will now describe the machine by which I am enabled to make this long leather-board tape.

A represents a roll such as is used by leather-board manufacturers, and is usually termed the "wet roll." I do not show in the drawings any of the parts of the machine used in producing the hollow cylinder of wet leather-board (A') that is supposed to be on the roll A, as it forms no part of my invention.

My machine comes into operation only when the wet roll is covered with the cylindrical layer of wet leather-board.

The bed or table of my machine is represented on the drawings by D, and is made like the bed of a lathe or planer having a longitudinal feed screw D' adapted to operate the tool carriage E in the usual manner. The feed screw D' is driven by the pulley $D^2$ at the required speed. The tool carriage E has united to it by a dove-tail as shown in Fig. 4, a cross slide E, said cross slide being adjusted to the position required by means of the screw E', Figs. 3 and 4, which acts through the screw lug $E^2$. The cross slide $E^3$ has hinged to it, by the ears $E^4$ $E^4$ and pivots $E^5$ $E^5$, Figs. 1 and 2, a cap piece H, which may be turned up when desired, so as to occupy the position indicated by dotted lines in Fig. 1.

H' is a sliding block held by the clamping cross bars $H^2$ $H^2$ firmly in the cap piece H. Within the sliding block, I place a cutter holder L', which has at its end a circular cutter L. In the drawings the cutter holder is represented as round, and is prevented from turning by means of a spline (see $L^2$, Fig. 3). If desirable, the cutter holder L' may have behind it a spring $L^3$, Fig. 3, so that the cutter L may follow the surface of the wet cylinder in case it is not perfectly true.

To prevent the tool carriage E from being carried too far by the screw shaft D' I have the following described device: The part K, Fig. 3, that projects downward from the carriage has a semi-circular opening cut in it to receive the screw shaft D', but has no thread on it. The lever K' has a semi-circular opening in it to correspond to the one on the projection K, but has a screw thread cut in it, adapted to engage with the screw on the screw-shaft D', so that when the lever K' $K^3$ (which is pivoted at $K^2$) is in the closed position shown in Fig. 3, then the turning of the screw shaft E will cause the tool carriage to move along its bed, and consequently cause the cutter L to traverse and do its work of cutting the tape from the cylinder of wet leather-board on the wet roll. To lock the lever in place, I have the latch $K^4$; this latch $K^4$ is pivoted to the lever $K'$ $K^3$, and has a lip on its inner end which engages with a ledge $K^7$ on the projection K, and thus holds the lever in position against the screw-shaft $D'$.

When the machine is in use, the tool carriage traverses the length of the bed from right to left; as it approaches the end of its run,—that is, when the cutter L has arrived at the end of the hollow cylinder of leather-board, then the outer end of the latch $K^4$ will come in contact with the stop arm N, Figs. 2 and 5, and be swung around so that its lip will be disengaged with the ledge $K^7$ on the projection K, and the lever $K'$ $K^3$ will drop so that its screw thread will no longer engage with the screw-shaft $D'$; although the screw-shaft continues to rotate, the tool carriage will remain stationary.

The operation of my machine is as follows: The wet roll A being covered with a sheet of wet leather-board by the usual process,—the sheet being in the form of a hollow cylinder surrounding the wet roll,—the cutter L is adjusted to the proper cutting position, then the lever $K'$ $K^3$ is brought up so that its screw thread will engage with the screw thread on the shaft $D'$; now as the roll A rotates, the cutter L will move slowly along and cut in a spiral line so as to cut from the cylinder of leather-board a continuous tape,—the shield C (adjustably attached to the sliding block $H'$) removing said tape from the wet roll and directing it away into some convenient receptacle,—a basket or box, for instance. This goes on until the cutter L has reached the end of the cylinder, then the stop-arm N will throw off the latch $K^4$ and allow the lever $K'$ $K^3$ to drop, thus freeing the tool carriage from engagement with the screw-shaft $D'$.

The tape or ribbon that leaves the wet roll is about one and three-fourths ($1\frac{3}{4}$) inches wide; when this has become sufficiently dry, it is cut longitudinally in narrow tapes and calendered.

I claim—

1. The method of making leather board tape direct from the pulp by the following described steps; first causing the pulp to be distributed evenly on the surface of a rotating " wet roll;" second cutting the pulp, thus distributed upon the "wet roll," into a spiral strip and simultaneously removing the severed strip from the "wet roll," substantially as, and for the purpose set forth.

2. In a leather board tape machine the combination of a rotating " wet roll," a longitudinally moving table, a cutting knife and shield mounted on said table, the said knife and shield moving longitudinally in relation to the "wet roll" and serving to cut spirally and remove from the "wet roll" the pulp, thus forming a tape of leather board substantially as and for the purpose set forth.

In testimony whereof I have signed my name to this specification, in the presence of two subscribing witnesses, on this 22d day of August, A. D. 1893.

WILLIAM P. GAY.

Witnesses:
FRANK G. HATTIE,
FRED E. DURGIN.